Patented Dec. 10, 1935

2,024,036

UNITED STATES PATENT OFFICE 2,024,036

PROCESS OF PREPARING THE ALKALI AND ALKALINE EARTH SALTS OF SUGAR PHOSPHORIC ACID ESTERS

Seigo Funaoka, Kuramada-cho, Sakyo-ku, Kyoto-shi, Japan

No Drawing. Application September 4, 1934, Serial No. 742,705. In Japan June 26, 1934

6 Claims. (Cl. 260—99.20)

This invention relates to the process of preparing the alkali and alkaline earth salts of sugar phosphoric acid esters by the interaction of various sugar solutions in aqueous pyridine with phosphorus oxychloride and also to obtain economically the soluble alkali and alkaline earth salts of esters for the subcutaneous or intravenous injection and also for the internal use in the medical treatments.

According to this invention, the solution of sugar in aqueous pyridine is mixed with phosphorus oxychloride at such low temperature as —20° C. (minus 20° C.) or less, whereby a chemical reaction takes place easily and phosphoric acid ester of sugars results. From the solution of the sugar phosphoric acid ester thus obtained, the organic bases are in the first place removed by means of low pressure distillation, and the distillates which contain pyridine are reserved for subsequent use. Secondly, the residual solution thus obtained is dissolved in water, neutralized with the carbonate and hydroxide of an alkali or alkaline earth metal, and the remaining pyridine is removed by passing hot air at 35° to 40° C. through the solution vigorously. Thirdly, the solution is subjected to vacuum distillation in order to remove the organic bases completely. Fourthly, the solution is diluted with a suitable quantity of water and the excess of the alkali is neutralized with carbon dioxide, the various kinds of poisonous salts contained as impurities are then removed as much as possible by dialysis in running water. Fifthly, the solution is treated with a silver salt, such as silver carbonate or sulfate, to remove a small quantity of chlorine remaining in the solution.

Sixthly, the excess of the soluble silver salt is precipitated by means of hydrogen sulfide and any excess of the latter is driven off by passing warm air at 35° to 40° C. through the solution or by vacuum distillation, and the precipitate is filtered off. Seventhly, the filtrate is made distinctly alkaline and allowed to stand for some time. After neutralization of the excess of the alkali with carbon dioxide, the solution is evaporated in vacuum and filtered. Finally, the ester salt in the filtrate is precipitated with ethyl alcohol.

The process in this invention is very rational and economical for the preparation of the phosphoric acid ester of a mono-saccharide such as fructose, glucose and galactose in the following points: The aqueous pyridine containing about 30% of water facilitates the dissolution of sugars. In the case of the reaction of the sugar solution with phosphorus oxychloride, considerable heat is evolved, it is necessary, therefore, to maintain the reaction mixture at very low temperature such as minus 20° C. during the reaction. In the practical case, phosphorus oxychloride must be used while in solution in a suitable solvent. Chloroform, carbon-tetrachloride, pyridine, benzene, ether, liquid paraffine may all be used as a solvent for this purpose, but chloroform is far more preferable from the economical and the chemical points of view. Upon the interaction of these two solutions, the phosphorus oxychloride solution is added drop by drop to the sugar solution of aqueous pyridine, while the latter solution must be stirred vigorously and be cooled to the said low temperature by the continuous flow of salt solution from the freezing mixture. At this stage, if the solution were not thoroughly cooled and stirred, the sugar or the phosphoric acid ester formed is liable to be charred and a considerable decrease in the yield of the phosphoric acid ester result therefrom. It is for this reason that the reaction mixture is maintained at the said low temperature which constitutes a very important step in the process. In the practical case, the phosphorus oxychloride is diluted with a solvent, such as chloroform, and the evolution of local heat may thereby be avoided and hence a uniform esterification can be obtained. If chloroform is used as the solvent it accumulates at the bottom of the apparatus after the reaction due to its greater specific gravity, it can be easily removed and recovered for farther use by purifying or subjecting to distillation.

The solution of aqueous pyridine obtained after removing the chloroform layer, contains all the sugar phosphoric acid ester either in the free state or as the salts of the organic base such as pyridine. For the purpose of recovering the excess of the free organic base remaining in the above solution, it is subjected to a vacuum distillation, and most of the organic base is thereby separated from the solution. The residual syrupy solution is diluted with water and then made alkaline with the hydroxide or carbonate of an alkali or alkaline earth metal, and the organic base remaining in it is removed as much as possible by passing hot air at 35° to 40° C. through the solution. By this process, the organic base which remains in the free state in the solution can easily be removed by volatilization, but it is difficult to drive it off in the form combined with the ester. Such combined pyridine can only be removed completely from the solution by adding a sufficient quantity of alkali or alkaline earth metal hydroxide so as to maintain a high degree of alkalinity in the solution and by means of a vacuum distillation. During this operation, however, the solution may become less alkaline due to the separation of the combined pyridine, it is therefore necessary to make the solution distinctly alkaline from time to time during the distillation.

Hence, the aeration, the vacuum distillation, and the degree of alkalinity constitute very important conditions for the complete removal of the pyridine, in consequence of which an increased yield of the pure ester salt results.

In the next place, the excess of alkali or alkaline earth hydroxide in the solution is neutralized by the formation of their carbonates by passing carbon dioxide through the solution.

The aqueous solution of the salts of sugar phosphoric acid ester thus obtained still contains various impurities, such as the lower phosphorus compounds, inorganic alkali and alkaline earth metal salts. These impurities can be removed by means of dialysis with an animal membrane in running water, while the salt of phosphoric acid ester remains unaffected by the dialysis due to its lesser degree of diffusibility than they of the soluble inorganic salts.

The solution of sugar phosphoric acid ester obtained by means af dialysis still contains a small amount of chlorine (as the alkali or alkaline earth chloride), which may act unpleasantly on the human body when the impure salt of sugar phosphoric acid ester is injected subcutaneously or intravenously. Hence, the above mentioned solution of sugar phosphoric acid ester must be further purified. For this purpose, the salt solution containing the small amount of of chlorine is treated with a small quantity of silver salt such as silver carbonate or silver sulfate and the chlorine is precipitated as the insoluble silver chloride, and the excess of silver is precipitated in the form of silver sulfide by passing hydrogen sulfide through the solution. The excess of hydrogen sulfide is completely driven off by passing hot air through the solution or by concentrating it under low pressure. From the above procedure, it is evident that the saving of the expensive silver carbonate or sulfate and consequently an economical preparation of the ester can be attained. Finally, the purification of the salt of sugar phosphoric acid ester is accomplished by the repeated precipitation from its aqueous solution with ethyl alcohol. In this last step, the metal combined with the ester may be partly given off, when the precipitate is dissolved in water. Hence, a suitable amount of alkali or alkaline earth metal hydroxide must be supplied, whereby an increase in the yield of the ester salt results.

An example of one of the methods of this invention is shown as follows: 1 kilogram of fructose is dissolved in 3 liters of aqueous pyridine (containing about 30% of water) and then cooled to —20° C. (minus 20° C.). 700 grams of phosphorus oxychloride dissolved in 1 liter of chloroform are then gradually added drop by drop in about five hours, the reaction mixture being stirred vigorously throughout this procedure. The solution of fructose phosphoric acid ester thus formed is separated out from chloroform layer, and the hydrated pyridine solution of the ester is subjected to a vacuum distillation at a temperature below 30° C., for the purpose of recovering the pyridine for further use (pyridine thus recovered can be repeatedly used after purification). The residual syrupy solution is dissolved in 10 liters of water and made distinctly alkaline with calcium carbonate and milk of lime. Then the remaining pyridine in the solution is driven off by passing warm air at 35° to 40° C. through the solution and by vacuum distillation. The solution is again made alkaline with lime and the excess of the alkali is neutralized with carbon dioxide. After it is evaporated to about one-third of its original volume, the filtered solution is subjected to dialysis in running water for about 10 hours. Then the remaining chloride is precipitated as silver chloride with 100 grs. of silver carbonate. After filtration, the excess of silver in the filtrate is removed by passing hydrogen sulfide through the solution, and the excess of this gas is removed by passing hot air at 35° to 40° C. through the solution or by concentrating it under low pressure and then filtering. Then the filtrate is made suitably alkaline with milk of lime and allowed to stand for about an hour. The excess of milk of lime is neutralized by carbon dioxide, the solution is concentrated under low pressure and the residual solution is filtered. The filtrate thus obtained is treated with three times of its volume of 95% ethyl alcohol and the precipitate thus obtained is again dissolved in water. The aqueous solution is made slightly alkaline with milk of lime for the purpose of supplying the calcium component and the solution is neutralized with carbon dioxide, concentrated under low pressure and filtered. The filtrate is treated with ethyl alcohol. The ethyl alcohol treatment is repeated three times, whereby about 700 grams of calcium salt of the fructose phosphoric acid ester are obtained in a very pure condition.

The calcium salt of the fructose phosphoric acid ester thus obtained is a white, amorphous powder, easily soluble in water and gives a clear, yellowish aqueous solution, and this solution gives no harmful stimulating action to human body when injected, for example, 5 to 15 ccm. of 5% aqueous solution of the salt, subcutaneously or intravenously. The calcium salt of the sugar phosphoric acid ester, when injected into the human body is carried to certain organs or to pathological tissues such as that of turberculosis, and is decomposed into sugar and inorganic calcium phosphate by the action of an enzyme, named phosphatase, contained in such organs or tissues.

The analytical results of the calcium salt of fructose phosphoric acid ester are given in the following tables.

Table 1—Phosphorus, calcium and ash

| Substance (in g.) | $Mg_2P_2O_7$ (in g.) | CaO (in g.) | Ash (as $Ca_2P_2O_7$) (in g.) |
|---|---|---|---|
| 0,1900 | 0,0632 | 0,0312 | |
| 0,1555 | 0,0514 | 0,0260 | |
| 0,1898 | | | 0,0810 |
| 0,1924 | | | 0,0821 |

| | Found value (mean) | Calculated value (from $C_6H_{11}O_4.PO_2Ca$) |
|---|---|---|
| Phosphorus | 10,54% | 10,41% |
| Calcium | 13,47% | 13,44% |
| Ash | 42,65% | 42,62% |
| Ca/P | 1,28 | 1,29 |

*Table 2—Specific rotating power (in water)*

Concentration of the solution=1,00; length of the measuring tube=22 cm.; degree of rotation= −0,46°

$[\alpha]_D = -20,9°$ (as $C_6H_{11}O_6PO_3Ca$)

$[\alpha]_D = -23.90°$ (calculated as $C_6H_{11}O_6.PO_3H_2$)

From the above analytical results, it will be seen that the calcium salt of the fructose phosphoric acid ester obtained by the method of the invention is extraordinarily pure.

Having now particularly described and ascertained the nature of my said invention and in which manner the same is to be performed, I claim:

1. The process of preparing the chemically pure and medicinal salts of sugar phosphoric acid esters with definite constitution, consisting in the synthesizing of the sugar phosphoric acid esters by the interaction of sugars dissolved in aqueous pyridine containing about 30% of water with phosphorus oxychloride dissolved in chloroform at minus 20° C., removing the excess of pyridine from the reaction mixture, neutralizing the residual syrupy solution with the carbonate and hydroxide of a metal, removing the remaining pyridine by passing warm air at 35° to 40° C. through the solution and by vacuum distillation, removing various impurities by dialysis, removing traces of chloride with silver carbonate, and finally the precipitating of the ester salts with ethyl alcohol.

2. A process for preparing salts of sugar phosphoric acid esters, consisting in subjecting a solution of sugar in aqueous pyridine to the action of a solution of phosphorus oxychloride in chloroform, eliminating the excess pyridine by basifying the reaction mixture and by means of vacuum distillation and by passing hot air through the reaction mixture, eliminating various poisonous salts by dialysis, eliminating chlorine which still remains with a silver salt and eliminating impurities by repeated precipitation with alcohol.

3. A process of preparing salts of sugar phosphoric acid esters, consisting in subjecting a solution of sugar in aqueous pyridine to the action of phosphorus oxychloride at minus 20° C., eliminating the excess pyridine from the reaction mixture, dissolving the phosphoric acid ester thus obtained in water, making the solution alkaline with the hydroxide and carbonate of a metal, subjecting the solution to a vacuum distillation and passing hot air through the solution, removing the various poisonous impurities by dialysis, eliminating chlorine which still remains in the solution with a silver salt, and treating the filtrate repeatedly with ethyl alcohol to eliminate the impurities.

4. A process of preparing the salts of the sugar phosphoric acid esters, consisting in subjecting a solution of sugar in aqueous pyridine to the action of phosphorus oxychloride at minus 20° C., eliminating the excess pyridine by basifying the phosphoric acid ester solution and then by means of a vacuum distillation and by passing hot air through the solution, diluting with water and basifying again with the hydroxide or carbonate of a metal, neutralizing the excess metal hydroxide as carbonates, eliminating various poisonous salts by dialysis, eliminating chlorine which still remains by converting it into insoluble silver chloride with a silver salt, and eliminating impurities by repeated precipitation with alcohol.

5. A process of preparing salts of sugar phosphoric acid esters, consisting in synthesizing the sugar phosphoric acid ester by subjecting a solution of sugar in aqueous pyridine to the action of phosphorus oxychloride at minus 20° C., eliminating the excess pyridine by basifying the phosphoric acid ester solution and then by means of a vacuum distillation and by passing hot air through the solution, eliminating various poisonous salts by dialysis, eliminating chlorine which still remains by converting it into insoluble silver chloride with a silver salt, eliminating the excess silver salt in the form of a silver sulfide with hydrogen sulfide, and eliminating impurities by the repeated precipitation with alcohol.

6. A process of preparing salts of the sugar phosphoric acid esters, consisting in synthesizing sulfuric acid ester by subjecting a solution of sugar in aqueous pyridine to the action of phosphorus oxychloride at minus 20° C., eliminating the excess of pyridine by basifying the phosphoric acid ester solution and by means of a vacuum distillation and by passing hot air through the solution, eliminating poisonous salts by dialysis, eliminating chlorine which still remains in the solution by converting it into insoluble silver chloride with a silver salt, eliminating the silver salt in excess in the form of silver sulfide with hydrogen sulfide and eliminating impurities by repeated precipitation with alcohol, and supplying at the same time cation components which have the tendency of separating out gradually and thus increasing the yield of the salt of the sugar phosphoric acid ester.

SEIGO FUNAOKA.